United States Patent
Wheeler (10) Patent No.: US 10,137,817 B1
(45) Date of Patent: Nov. 27, 2018

(54) SEED DISPENSING DEVICE AND SYSTEM

(71) Applicant: Lyle Wheeler, West Helena, AR (US)

(72) Inventor: Lyle Wheeler, West Helena, AR (US)

( * ) Notice: Subject to any disclaimer, the term of this patent is extended or adjusted under 35 U.S.C. 154(b) by 362 days.

(21) Appl. No.: 14/957,428

(22) Filed: Dec. 2, 2015

(51) Int. Cl.
*B60P 1/40* (2006.01)
*B65G 33/14* (2006.01)
*B65G 67/24* (2006.01)

(52) U.S. Cl.
CPC ............... *B60P 1/40* (2013.01); *B65G 33/14* (2013.01); *B65G 67/24* (2013.01)

(58) Field of Classification Search
CPC ........................................................ B60P 1/40
USPC .................................................. 414/502, 526
See application file for complete search history.

(56) References Cited

U.S. PATENT DOCUMENTS

| | | | | |
|---|---|---|---|---|
| 2,613,004 A * | 10/1952 | Kane | ........................ | B60P 1/40 198/320 |
| 2,743,571 A * | 5/1956 | Turnbull | ............ | A01D 41/1217 414/526 |
| 2,883,076 A * | 4/1959 | Palmer | ...................... | B60P 1/40 198/589 |
| 2,991,895 A * | 7/1961 | Dietzenbach | ............. | B60P 1/40 198/317 |
| 3,322,257 A * | 5/1967 | Phillips | .................... | B28C 7/167 198/536 |
| 3,391,778 A * | 7/1968 | Lasiter | ...................... | B60P 1/40 198/530 |
| 3,498,483 A * | 3/1970 | Meharry | ............... | A01C 15/003 198/311 |
| 3,717,272 A * | 2/1973 | Chartier | ............... | A01C 15/003 198/313 |
| 4,613,275 A * | 9/1986 | Karlowsky | ............... | B60P 1/40 198/632 |
| 5,257,893 A * | 11/1993 | Sevits | ..................... | B65D 88/16 222/105 |
| 5,520,495 A * | 5/1996 | Sukup | .................. | A01C 15/003 414/504 |
| 5,718,556 A * | 2/1998 | Forsyth | ..................... | B60P 1/36 198/317 |
| 5,785,481 A * | 7/1998 | Ockels | ...................... | B60P 1/42 222/1 |
| 6,120,233 A * | 9/2000 | Adam | ....................... | B60P 1/42 222/105 |
| 7,488,149 B2 * | 2/2009 | Waldner | ............... | A01C 15/003 198/311 |
| 9,333,892 B2 * | 5/2016 | Johnson | .................... | B60P 1/36 |

* cited by examiner

*Primary Examiner* — Jonathan Snelting
(74) *Attorney, Agent, or Firm* — Schrantz Law Firm, PLLC; Stephen D. Schrantz (57) ABSTRACT

The dispensing device and system pivotally attach to a hopper bottom trailer to deliver seed from the trailer to planters located throughout the farm. A main conduit inserts into a housing installed at the hopper of the trailer. A gate opens that allows seed to flow through the hopper into the housing. A main conduit inserts into the housing to collect seed and lift the seed both vertically and horizontally. An auger directs the seed upwards through the main conduit towards the dispensing conduit. The seed then gravitationally feeds downward from the dispensing conduit. A flexible conduit enables the user to direct the seed to different planters without moving the trailer.

9 Claims, 10 Drawing Sheets

SEED DISPENSING DEVICE AND SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to moving and dispensing seed to be used in agriculture. The present invention replaces the need for manually carrying or specialized equipment for moving the seed to a planter. The present invention provides a new device and system that can be retrofitted on existing trailers for use.

II. Description of the Known Art

In the agricultural industry, large grain producers transport seed to the farm to be used. This seed is placed within a planter in the field. Previously, farmers manually carried bags of the seed to the planter. This process of manually carrying the seed was a slow and difficult task.

Farmers began using a wheeled cart on which the seed bag can be placed and transported to the planter where some elevator device such as a screw auger must be used to raise the seed from the bag to a height sufficient to fill the planter's grain boxes. These augers were immobile and fixed in one position to operate with the planter. This process also required moving the seed twice.

Patents and patent applications disclosing relevant information are disclosed below. These patents and patent applications are hereby expressly incorporated by reference in their entirety.

U.S. Pat. No. 6,120,233 issued to Adam on Sep. 19, 2000 ("the '233 patent") teaches a bulk seed bag carrier and dispenser adapted to transport and dispense the contents of a plurality of bulk seed bags. The bag carrier and dispenser taught by the '233 patent includes a plurality of hoppers having V-shaped bottoms which help to empty the contents of the bag as well as stabilize the bag within the hopper. A horizontal auger taught by the '233 patent is disposed below the hoppers and empties into a discharge auger having a movable and telescoping spout. The hoppers of the bulk seed carrier taught by the '233 patent are offset to one side to allow a fork lift to move closer to the hoppers. The bulk seed carrier taught by the '233 patent is preferably controlled by a wireless remote control.

U.S. Pat. No. 5,785,481 issued to Ockels on Jul. 28, 1998 ("the '481 patent") teaches a trailer for dispensing different types of bulk material such as seed into planting equipment is disclosed, the trailer including a pair of substantially planar platforms with an elongated conveying bin disposed below and between the platforms. The '481 patent teaches that seed from one or more of the bulk bags falls into the bin and is conveyed by way of an auger forward to a hopper located at the ends of the platforms. From the hopper taught by the '481 patent, the seed is dispensed into planting equipment by way of a pivotally mounted elevated auger which swings in about a 180.degree. arc so as to dispense seed on both sides of the trailer. The elevated auger and corresponding tube taught by the '481 patent are mounted to the trailer by way of a hanging pivot member which enables the auger to pivot between a dispensing position in which the intake end of the auger is located in the hopper and a storage position where the auger tube extends rearwardly above the platforms.

U.S. Pat. No. 5,718,556 issued to Forsyth on Feb. 17, 1998 ("the '556 patent") teaches a bulk granular material transport system having multiple compartments with a detachable elevating conveyor to permit the conveyor to assist with unloading as well as loading of the transport device. Each compartment taught by the '556 patent may be individually discharged onto a horizontal conveyor which delivers the seed to the elevating conveyor when the elevating conveyor is in its first position. The elevating conveyor taught by the '556 patent is suspended from an adjustable crane which is pivotable on the frame of the transport system. The elevating conveyor taught by the '556 patent may be released from its first position such that the discharge of the elevating conveyor may be positioned over a compartment of the transport device. All mechanisms taught by the '556 patent are individually actuable through a remote control device.

U.S. Pat. No. 5,257,893 issued to Sevits on Nov. 2, 1993 ("the '893 patent") teaches a portable dispenser apparatus for bulk bags is mounted on a longitudinally extending frame that is suitable for mounting on a trailer or a truck. The bags taught by the '893 patent are mounted on a platform with an opening under which is attached a chute and an auger. The platform taught by the '893 patent is supported on the frame such that the chute and auger fit under the platform as close as possible to the ground and, in a preferred form, so that the auger can be pivoted and rotated. Material taught by the '893 patent flows under force of gravity from the bag, through the opening, down the chute and into the auger from which it is supplied to a planter, grinder mixer, spreader and so forth. The '893 patent teaches that when the bag has a spout a cinch or the like is provided to check the flow.

These shortcomings are overcome by the invention disclosed herein. Accordingly, it would be desirable to provide an improved device and system for loading the planter.

SUMMARY OF THE INVENTION

The present invention provides a method and system for moving seed to a planter. The dispensing device of the present invention attaches to a trailer that transports the seed. In one embodiment, the trailer is a hopper bottom trailer that directs the contents of the trailer to the hopper. The user loads the trailer with seed to be transported to the farm. The user can then transport the trailer and seed to the farm. The dispensing device of the present invention allows the user to load the planters with seed directly from the trailer.

The dispensing device eliminates the need to unload the trailer into wagons or other equipment necessary to transport the seed to the planters. Instead, the user drives the trailer filled with seed to the planters. The user then pivots the support arm away from the trailer to position the main conduit away from the trailer.

The support arm pivotally attaches to the trailer for swinging the support arm and main conduit away from the trailer. The main conduit provides an entrance end for accepting the seed and an exit end for dispersing the seed. The entrance end of the main conduit inserts into a housing installed onto the trailer at the hopper.

The trailer provides a trailer aperture at the hopper installation point. The trailer aperture enables the seed to flow from the trailer through the hopper into the housing. The walls of the hopper slant to direct the seed towards the insertion aperture and guide conduit.

The main conduit with auger is inserted into the hopper. The auger transports the seed from the hopper into the conduit. The seed travels upward through the main conduit and out the dispensing conduit. The dispensing conduit provides a flexible section that enables movement of the dispensing conduit. The flexible section allows the user to position the dispensing conduit to different positions for unloading the trailer. Moving the dispensing conduit is simpler than moving the trailer.

It is an object of the present invention to dispense seed from a trailer.

It is also an object of the present invention to retrofit existing trailers with the dispensing device and system.

It is also an object of the present invention to simplify the process of delivering seed to the planters.

It is also an object of the present invention to enable the user to deliver seed to multiple planters without moving the trailer.

It is also an object of the present invention to reduce the equipment needed at the farm.

It is also an object of the present invention to reduce the number of times that the seed must be transferred between equipment.

These and other objects and advantages of the present invention, along with features of novelty appurtenant thereto, will appear or become apparent in the course of the following descriptive sections and the attached drawings.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
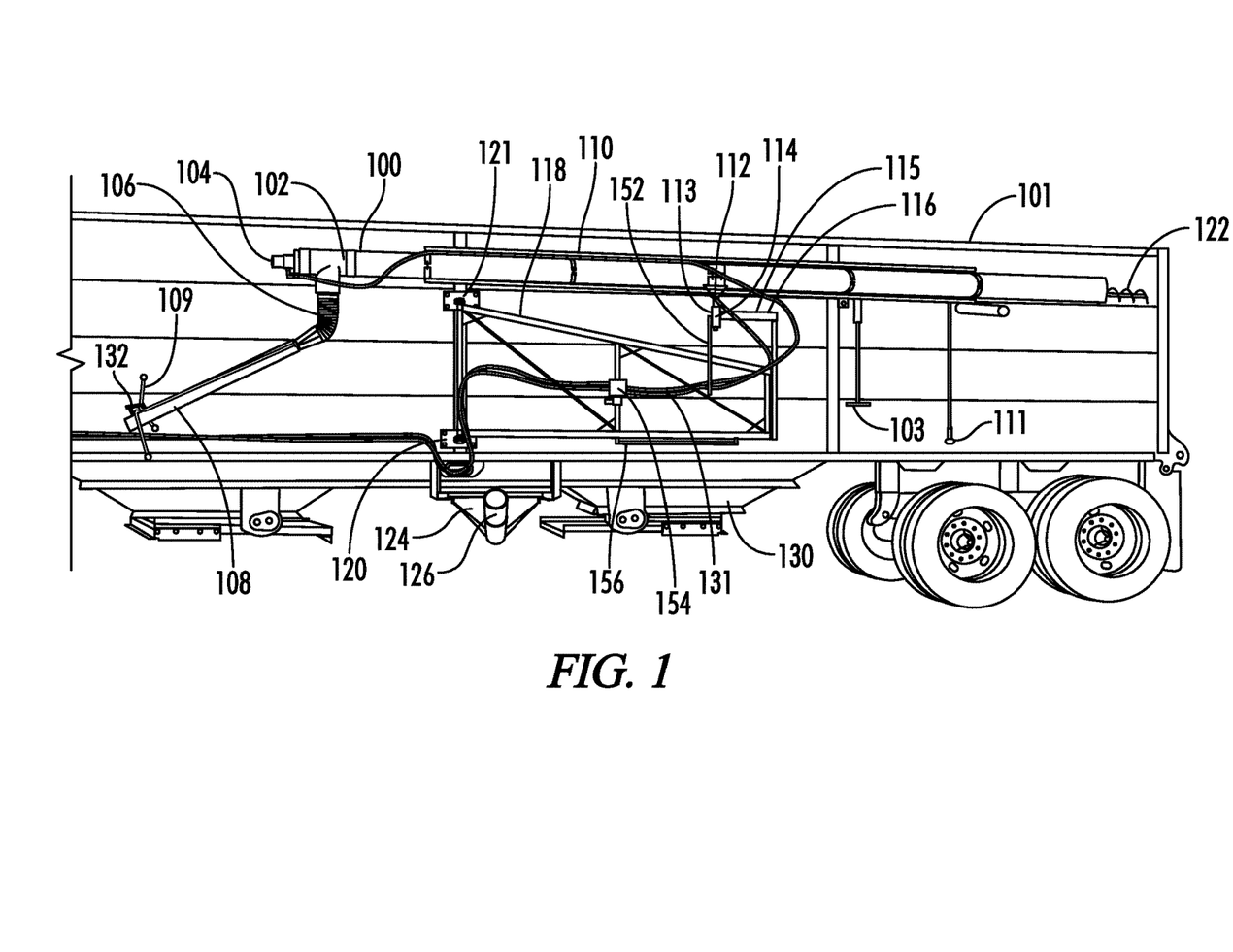
FIG. 1 is an environmental view of one embodiment of the present invention.

FIG. 1 shows the dispensing device 100 secured to trailer 101. The dispensing device 100 is placed in transport mode as shown in FIG. 1 when travelling. The dispensing device 100 secures against the trailer while the trailer 101 is in motion.

Support arm 118 pivotally attaches to trailer 101 at support attachments 120, 121. Support attachments 120, 121 allow pivoting of support arm 118 away from trailer 101 for use. Support arm 118 pivots away from trailer 101 to position the main conduit 102 into the housing 124.

In one embodiment, tether 156 secures the support arm 118 against the trailer 101 while the auger is in use. Tether 156 limits movement of the main conduit 102 to retain the auger 122 within housing 124 during operation of the auger. The user releases tether 156 from the trailer 101 to reposition the support arm 118 for travel.

The main conduit pivots at pivots 112, 114, 116. Support brace 110 increases the rigidity of conduit 102 to prevent flexing of the conduit while in use. Support brace 110 provides an attachment point for securing conduit 102 to pivot 112. Auger 122 extends through main conduit 102. The auger 122 draws seed into the main conduit 102 at auger 122 to deliver the seed via dispensing conduit 108. Flexible conduit 106 enables the user to move dispensing conduit 108. The flexibility of conduit 106 allows the user to deliver seed to multiple planters without moving the trailer 101.

The dispensing device 100 is secured in the transport mode as shown in FIG. 1. Latch 103 secures the main conduit 102 and the support 110 to the trailer 101. Latch 103 limits movement of the main conduit and prevents the main conduit from moving away from the trailer 101 into the use mode.

Tether 109 secures dispensing conduit 108 to trailer 101. The tether attaches to trailer 101 and passes over dispensing conduit 108 and through grip 132. Securing dispensing conduit 108 to the trailer 101 prevents damage to other property and the dispensing device 100.

The dispensing device 100 also provides an adjustment arm 111 that assists with adjusting the main conduit 102 between use mode and transport mode. Latch 103 is located high enough on the trailer such that some users need assistance placing the main conduit 102 within latch 103 for securing the main conduit 102 into transport mode. Adjustment arm 111 is constructed from a rigid material, such as metal, to assist the user when lifting the main conduit 102 upwards into latch 103. Adjustment arm 111 of one embodiment attaches to support 110 to assist with positioning main conduit 102.

In transport mode, the first end 99 of the main conduit 102 is secured adjacent the trailer 101. To dispense seed from the trailer, the user first secures the housing 124 at hopper 130 of trailer 101. The user inserts the first end 99 of the main conduit 102 into insertion aperture 126 of housing 124 to dispense the seed through the dispensing device 100. To insert the first end 99 into insertion aperture 126, the user first releases the latch 103 and tethers 109 to reposition the main conduit 102 and support arm 118.

The user then pivots the support arm 118 outward away from trailer 101. Pivot 116 allows the user to rotate pivot arm 115 around a first axis, such as a vertical axis. Pivot arm 115 positions pivots 112, 114 radially outward from pivot 116. Handle 152 provides the user with a grip to position pivot arm 115. The handle 152 assists the user with inserting the auger 122 into housing 124. In one embodiment, the handle 152 is secured to the vertical support 113.

Pivot 114 enables rotation of vertical support 113. Rotation of vertical support 113 via pivot 114 allows rotation of main conduit 102 around the vertical axis. Conduit 102 pivots on a second axis, such as a lateral axis, at pivot 112.

Pivot 112 adjusts the height of first end 99 and auger 122. The user adjusts the height of first end 99 and auger 122 for insertion of the auger 122 into insertion aperture 126. The user inserts first end 99 of the main conduit 102 into insertion aperture 126 of the guide conduit. The tether 156 of one embodiment secures support 110 to the trailer 101 during operation of the auger 122. The user can then start the actuator 104 and auger 122 to transfer the seed from trailer 101 and housing 124 into the planter. The seed travels from first end 99 to the dispensing conduit 108. Auger 122 directs the seed from the first end 99 to the dispensing conduit 108.

At least a portion of auger 122 is exposed outside of the first end 99 of main conduit 102. The first end 99 inserts into insertion aperture 126. The exposure of auger 122 outside of main conduit 102 increases contact of auger with the seed. The user inserts auger 122 into the housing 124 at insertion aperture 126. The auger 122 inserted into housing 124 at hopper 130 contacts the seed within housing 124. The auger 122 transports the seed up the main conduit 102 towards actuator 104 and dispensing conduit 108. The seed reaches the dispensing conduit 108 that gravitationally feeds the seed through the dispensing conduit 108 and delivers the seed to the planter.

Figure 2:
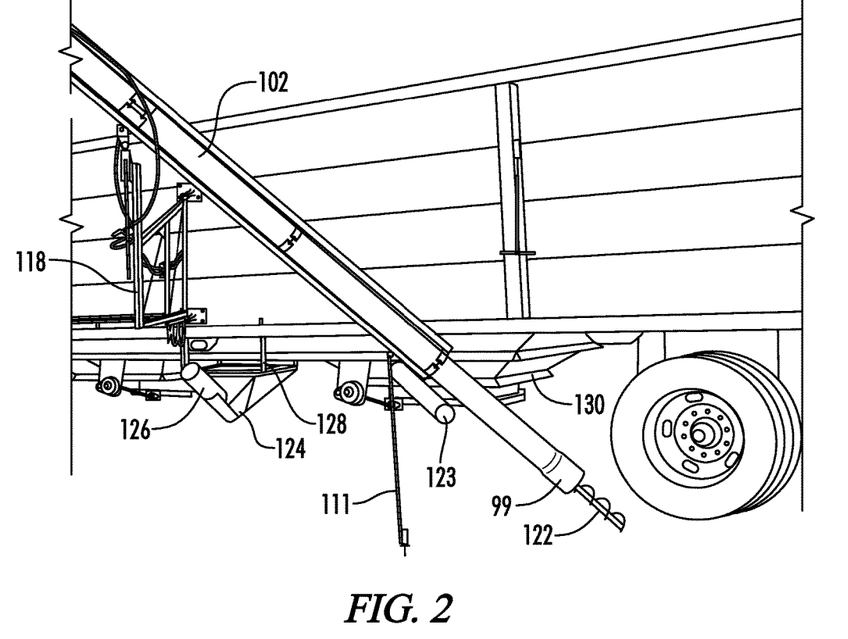
FIG. 2 is an environmental view thereof.

FIGS. 1 and 2 show housing 124 secured to the bottom of the trailer 101. The attachment arms of the housing contact an attachment body 128 extending vertically below the trailer 101. The attachment body 128 secures the housing 124 to the trailer 101 for transportation. The attachment body 128 secures the housing 124 to the trailer 101 with sufficient clearance above the ground to allow movement of the trailer 101 without damaging housing 124.

Hopper 130 of the trailer 101 allows seed to flow through the trailer 101. The seed flows from trailer 101 through a trailer aperture within the trailer located at hopper 130. A gate located at the hopper 130 controls the flow of the seed from the hopper 130. The gate closes to prevent seed from flowing through hopper 130. To enable the seed to be delivered, the gate is opened to allow the seed through hopper 130.

FIG. 2 shows the main conduit 102 released from transport mode. Auger 122 inserts into insertion aperture 126 to be used. Because auger 122 inserts downward into housing 124, weight 123 biases the auger 122 downwards towards housing 124. Weight 123 counters the weight of the actuator, main conduit, flexible conduit, and dispensing conduit at pivot 112.

Figure 3:
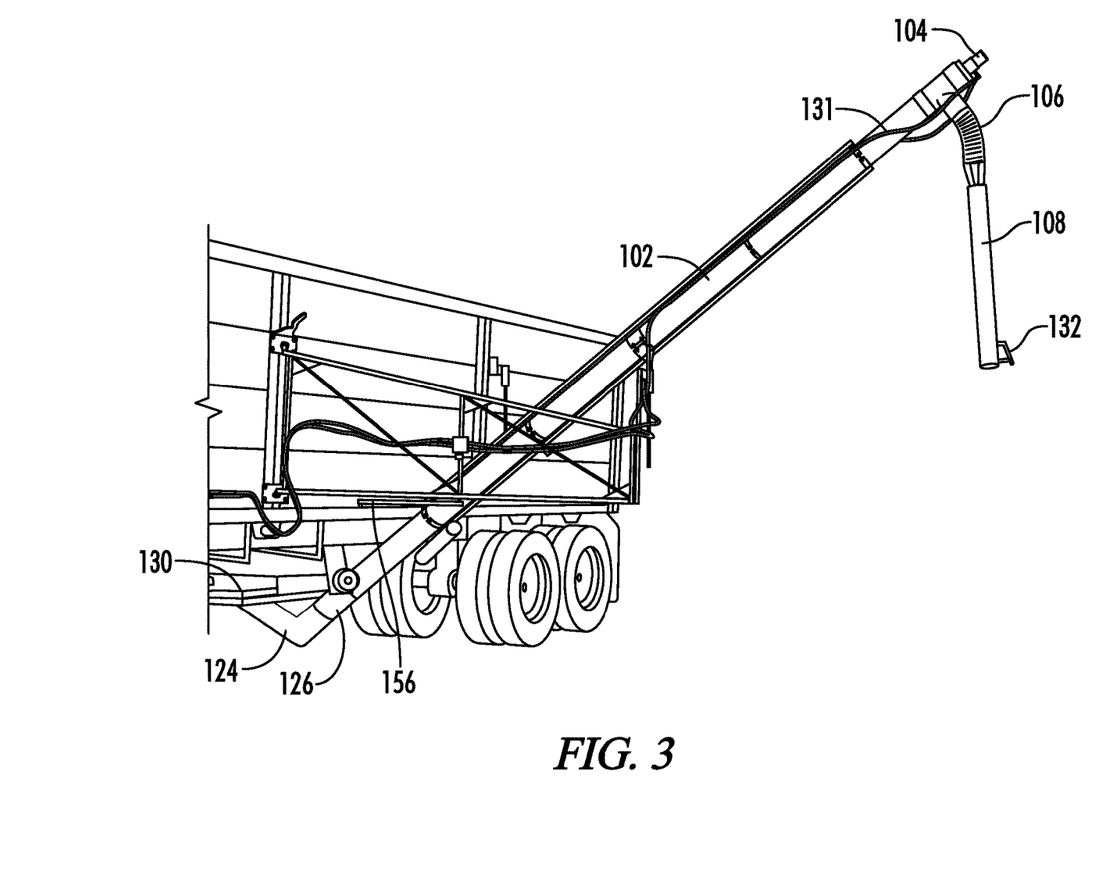
FIG. 3 is an environmental view thereof.

The housing 124 secures to the trailer 101 at hopper 130 as shown in FIG. 3. The user inserts auger 122 into housing 124 at insertion aperture 126. The user opens gate at hopper 130 to allow seed to flow into housing 124 from trailer 101. The auger 122 driven by actuator 104 draws the seed into main conduit 102. The seed then flows through flexible conduit 106 and dispensing conduit 108 for delivery of the seed into the planters. FIG. 3 also shows the lines 131 to actuator 104 that activate the actuator 104. The actuator 104 can be driven by hydraulics, electricity, pneumatics, etc. In one embodiment, a relief valve 154 connects the lines 131 to prevent damaging the auger 122 and actuator 104 due to increased pressure of the fluid, such as oil or other liquid. The relief valve 154 enables the hydraulic pressure to bypass actuator 104 to reduce movement of auger 122.

Figure 4:
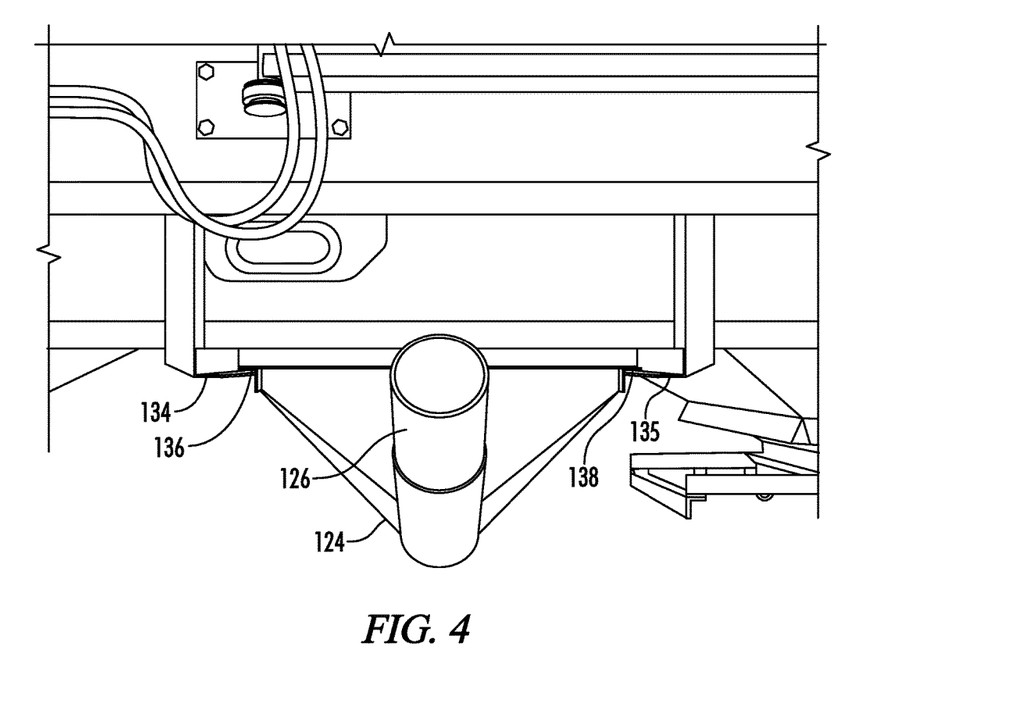
FIG. 4 is an environmental view thereof.
Figure 5:
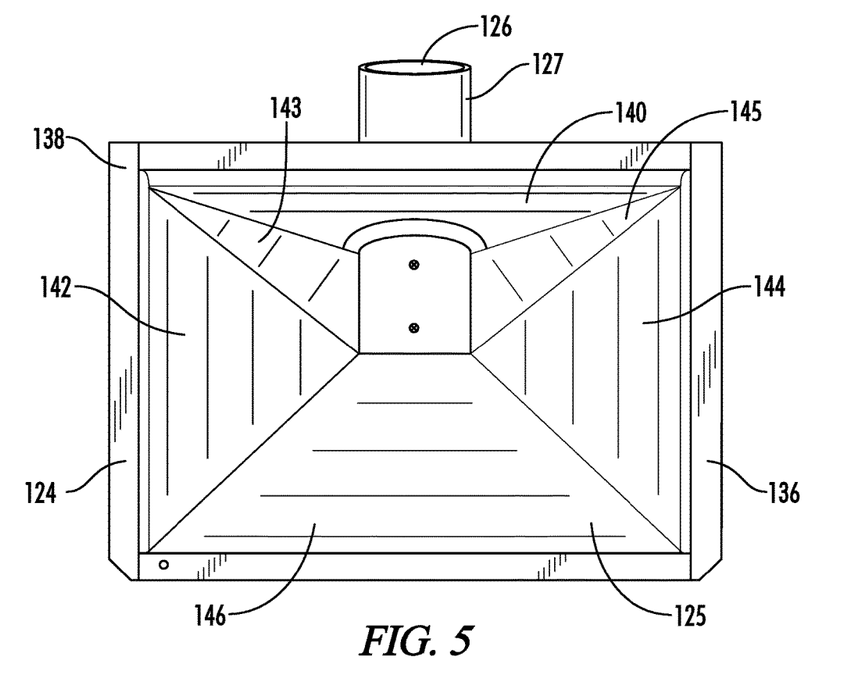
FIG. 5 is a top view of a housing of one embodiment of the present invention.
Figure 6:
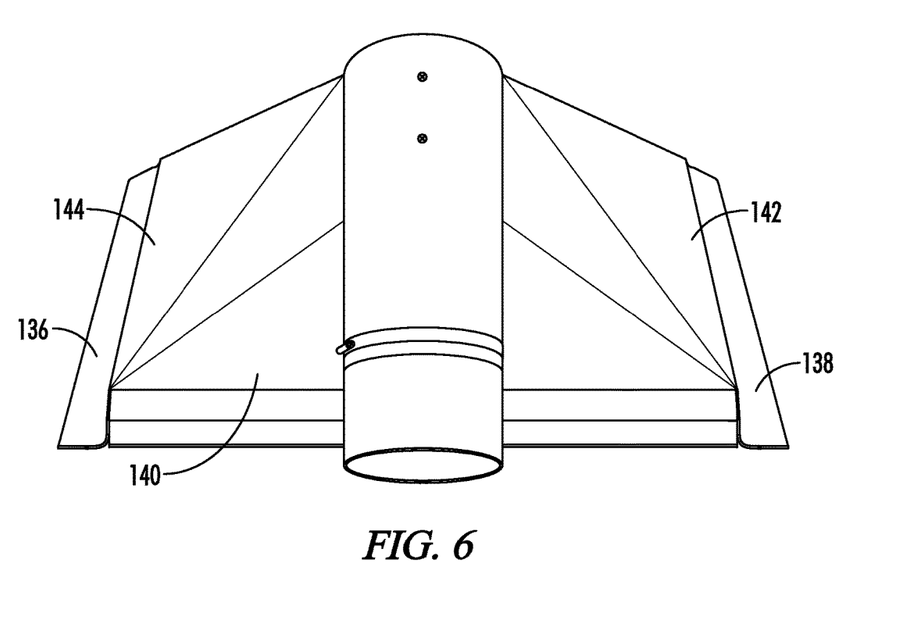
FIG. 6 is a bottom view thereof.
Figure 7:
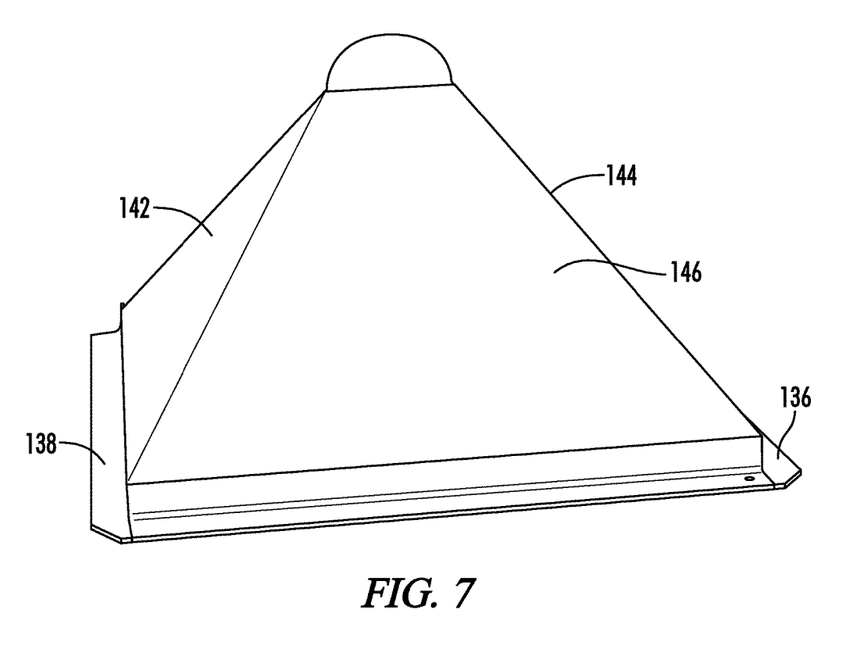
FIG. 7 is a rear view thereof.
Figure 8:
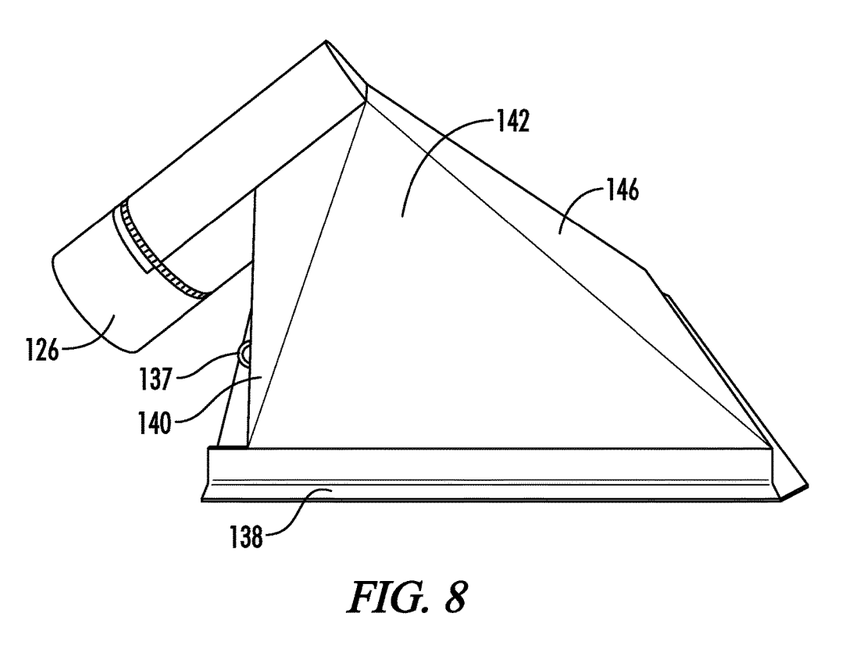
FIG. 8 is a right side view thereof, the left side view being a mirror image of the right side view.

FIG. 4 shows the housing 124 secured to the attachment body via trailer arms 134, 135. Trailer arms 134, 135 support attachment arms 136, 138 of the housing 124. In one embodiment, the housing 124 secures to the attachment body and trailer 101. A pin or other fastener inserts into an aperture 137, shown in FIG. 8, that passes through both the housing 124 and the trailer 101 to secure the housing 124 to trailer 101. In another embodiment, the pin or other fastener inserts into an aperture that passes through both the attachment arm 136, 138 and the trailer arm 134, 135. The pin or other fastener limits movement of the housing 124 when in transport mode to secure the housing 124 to the trailer 101.

FIGS. 5-8 show different views of the housing 124. Upper aperture 125 of housing 124 allows seed to flow downward from trailer 101 into housing 124. The seed flows from the trailer 101 through hopper 130 into housing 124.

Attachment arms 136, 138 extend laterally outward from the side walls 142, 144. The attachment arms 136, 138 support the housing 124 when the housing 124 is secured to the trailer 101 at either hopper 130 or on the attachment body via trailer arms 134, 135. Fastener aperture 137 of housing 124 accepts the fastener or pin to secure the housing 124 to trailer 101 as described above.

Side walls 142, 144 and rear wall 146 direct the seed towards front wall 140, insertion aperture 126, and guide conduit 127. The seed flows from the trailer 101 into housing 124. The auger 122 inserts into insertion aperture 126. Guide conduit 127 directs auger 122 to the bottom of housing 124. Side walls 142, 144 and rear wall 146 direct the seed towards the auger 122. Because seed is directed towards guide conduit 127, insertion aperture 126 and front wall 140, the front wall 140 is shaped to direct the seed down towards insertion aperture 126 and guide conduit 127. Wings 143, 145 angle inwards and down toward guide conduit 127.

Figure 9:
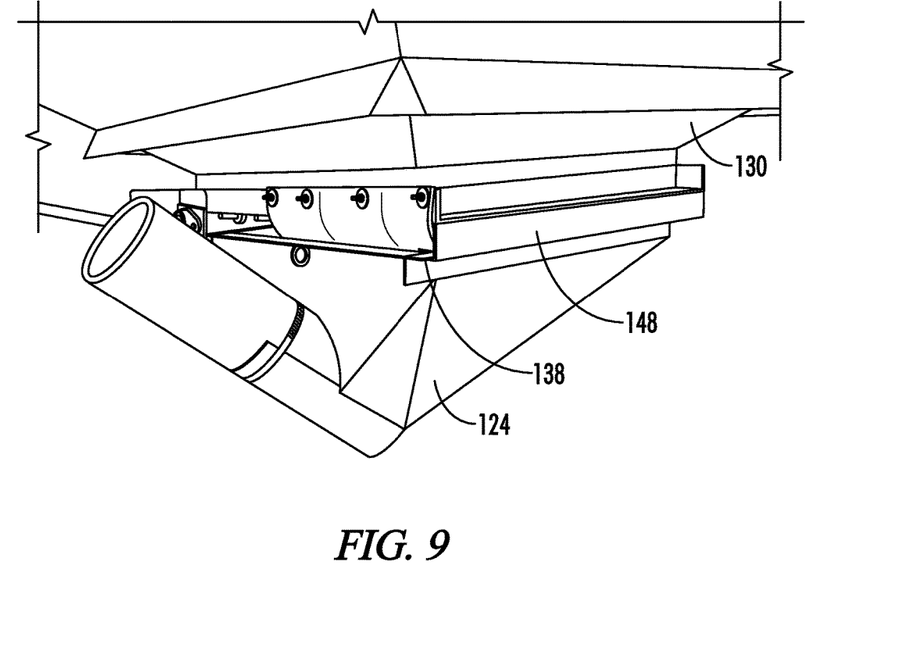
FIG. 9 is an environmental view of one embodiment of the present invention.
Figure 10:
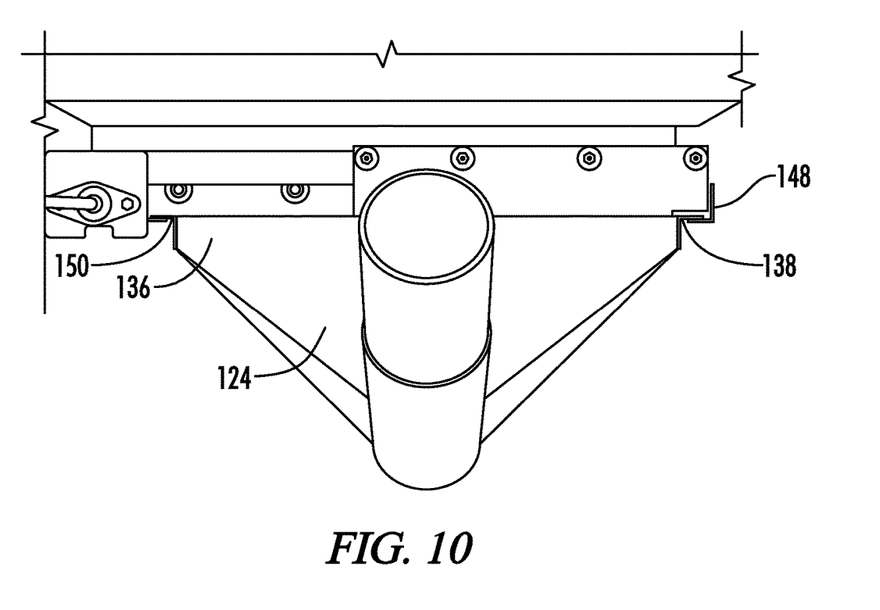
FIG. 10 is an environmental view thereof.

FIGS. 9 and 10 show the housing 124 installed onto trailer 101 at hopper 130. A gate of hopper 130 opens and closes to control the flow of seed from trailer 101 through hopper 130 into housing 124. Hopper arms 148, 150 support attachment arms 136, 138 of housing 124 to secure the housing 124 to trailer 101 at hopper 130.

In one embodiment, support 110 attaches to the trailer after the auger 122 inserts into housing 124 via insertion aperture 126. The user may tether or otherwise secure support 110 to the trailer 101 while the auger 122 is inserted into housing 124. The attachment of the support 110 to the trailer 101 via tether 156 secures both the main conduit 102 and the housing 124 into use mode. In another embodiment, a fastener or pin inserts into aperture 137 of housing 124 and trailer 101 at hopper 130 to secure the housing in use mode. In use mode, the auger 122 transfers the seed from the housing 124 through dispensing conduit 108 to the planters.

Although the present invention has been described and illustrated with respect to a preferred embodiment and a preferred use therefor, it is not to be so limited since modifications and changes can be made therein which are within the full intended scope of the invention.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:
1. A seed dispensing system for delivering seed to a planter from a hopper bottom trailer, the system comprising:
a main conduit that accepts the seed;
an auger within the main conduit, the auger transporting the seed through the main conduit;

a housing accepting seed from the trailer wherein the housing slidingly mounts onto the trailer;

a hopper of the trailer wherein the housing attaches to the trailer at the hopper below the trailer;

an attachment arm extending laterally outwards from the housing;

a trailer arm extending vertically below an opening in the trailer at the hopper wherein the trailer arm vertically supports the attachment arm of the housing, the attachment arm slidingly mounts above the trailer arm to secure the housing to the trailer wherein the attachment arm contacts the trailer arm below the opening;

a housing aperture of the housing that accepts seed from the trailer through the hopper;

an insertion aperture of the housing that accepts the auger, the auger transferring seed from the housing into the main conduit;

a dispensing conduit attached to the main conduit, the auger transporting the seed from the main conduit to the dispensing conduit, the seed exiting through the dispensing conduit.

2. The system of claim 1 further comprising:

a flexible conduit between the dispensing conduit and the main conduit, the auger transporting the seed from the main conduit to the flexible conduit, the flexible conduit enabling adjustment of the dispensing conduit.

3. The system of claim 1 further comprising:

a support arm pivotally attached to the trailer wherein the support arm enables horizontal positioning of the main conduit radially outwards from the pivotal attachment of the support arm to the trailer.

4. The system of claim 3 further comprising:

a first pivot securing the main conduit to the support arm, the first pivot enabling rotation of the main conduit around a vertical axis;

a second pivot securing the main conduit to the support arm, the second pivot enabling rotation of the main conduit around a horizontal axis.

5. The system of claim 4 further comprising:

a pivot arm to which the first pivot and second pivot attach;

a third pivot that pivotally attaches the support arm to the pivot arm.

6. The system of claim 5 wherein the pivot arm adjusts the position of the first pivot and the second pivot radially outward from the third pivot.

7. The system of claim 6 further comprising:

a guide conduit of the housing that accepts at least a portion of a first end of the main conduit wherein the auger is at least partially exposed outside the first end of the main conduit.

8. A seed dispensing system for delivering seed to a planter from a hopper bottom trailer, the system comprising:

a main conduit that accepts the seed;

an auger within the main conduit, the auger transporting the seed through the main conduit, the auger at least partially exposed from the main conduit;

a housing accepting seed from the trailer;

a hopper of the trailer wherein the housing attaches to the trailer at the hopper;

a trailer aperture located within the trailer wherein seed flows through the trailer aperture at the hopper;

a housing aperture that accepts seed from the trailer through the hopper wherein the attachment of the hopper to the trailer at the hopper aligns the housing aperture with the trailer aperture;

a first attachment arm and a second attachment arm of the housing, the attachment arms extending laterally outward from the housing wherein the housing aperture is located between the first attachment arm and the second arm, the first attachment arm and the second attachment arm extending away from the housing aperture;

a first trailer arm and a second trailer extending vertically below the trailer aperture wherein the trailer arms vertically support the attachment arms of the housing by sliding the attachment arms over the trailer arms;

an insertion aperture of the housing that accepts the auger, the auger transferring seed from the housing into the main conduit;

a guide conduit of the housing that accepts at least a portion of the main conduit wherein the auger inserts into the housing to transfer the seed from the housing into the main conduit;

a dispensing conduit attached to the main conduit, the seed flowing from the main conduit into the dispensing conduit, the seed exiting through the dispensing conduit;

a support arm pivotally attached to the trailer wherein the support arm enables horizontal positioning of the main conduit radially outwards from the pivotal attachment of the support arm to the trailer.

9. The system of claim 8 wherein the first trailer arm and the second trailer extend towards each other.

* * * * *